March 23, 1937.　　H. M. HESSENBRUCH　　2,074,547
TRIMMING MACHINE
Filed July 23, 1935　　8 Sheets-Sheet 4
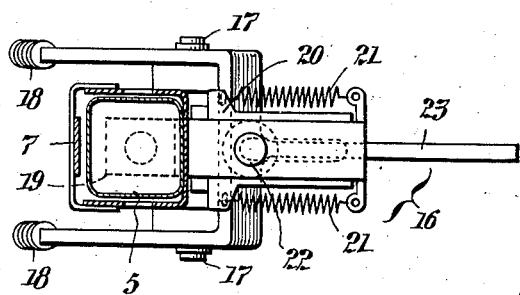
FIG. VI.
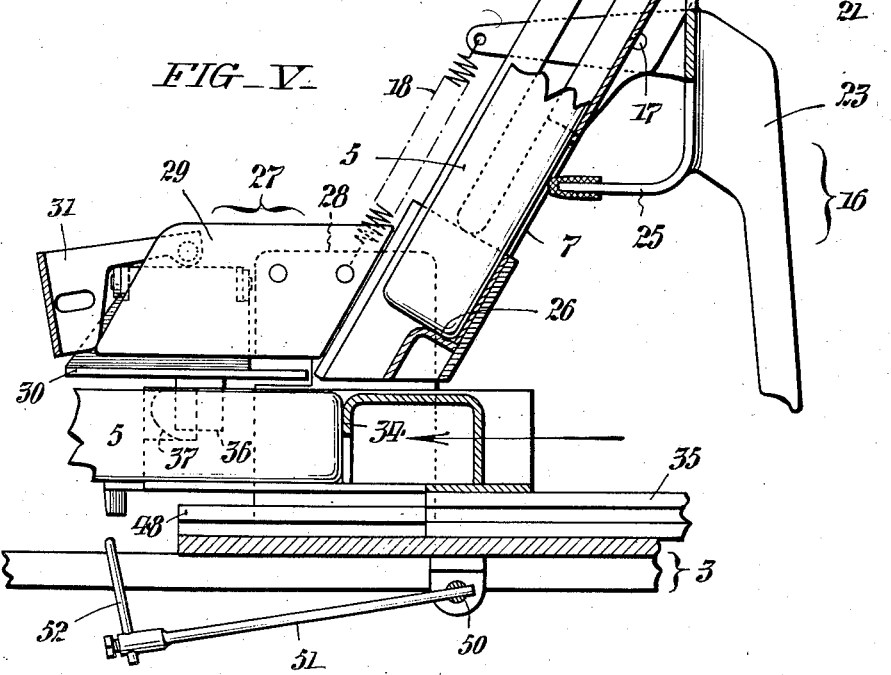
FIG. V.
WITNESSES:
Hubert Fuchs
William Bell, Jr.
INVENTOR:
Hermann M. Hessenbruch,
BY Frailey Paul
ATTORNEYS.

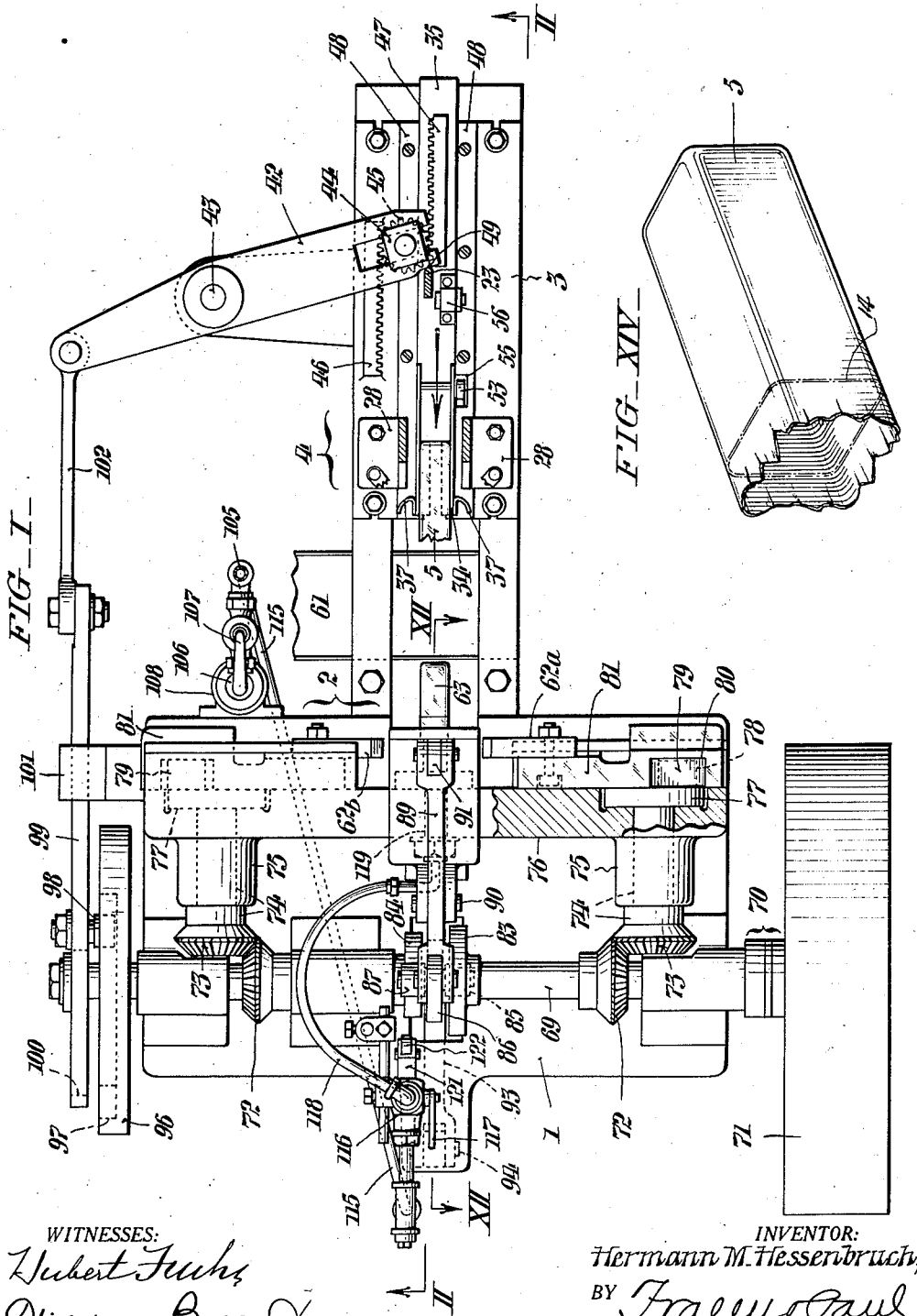

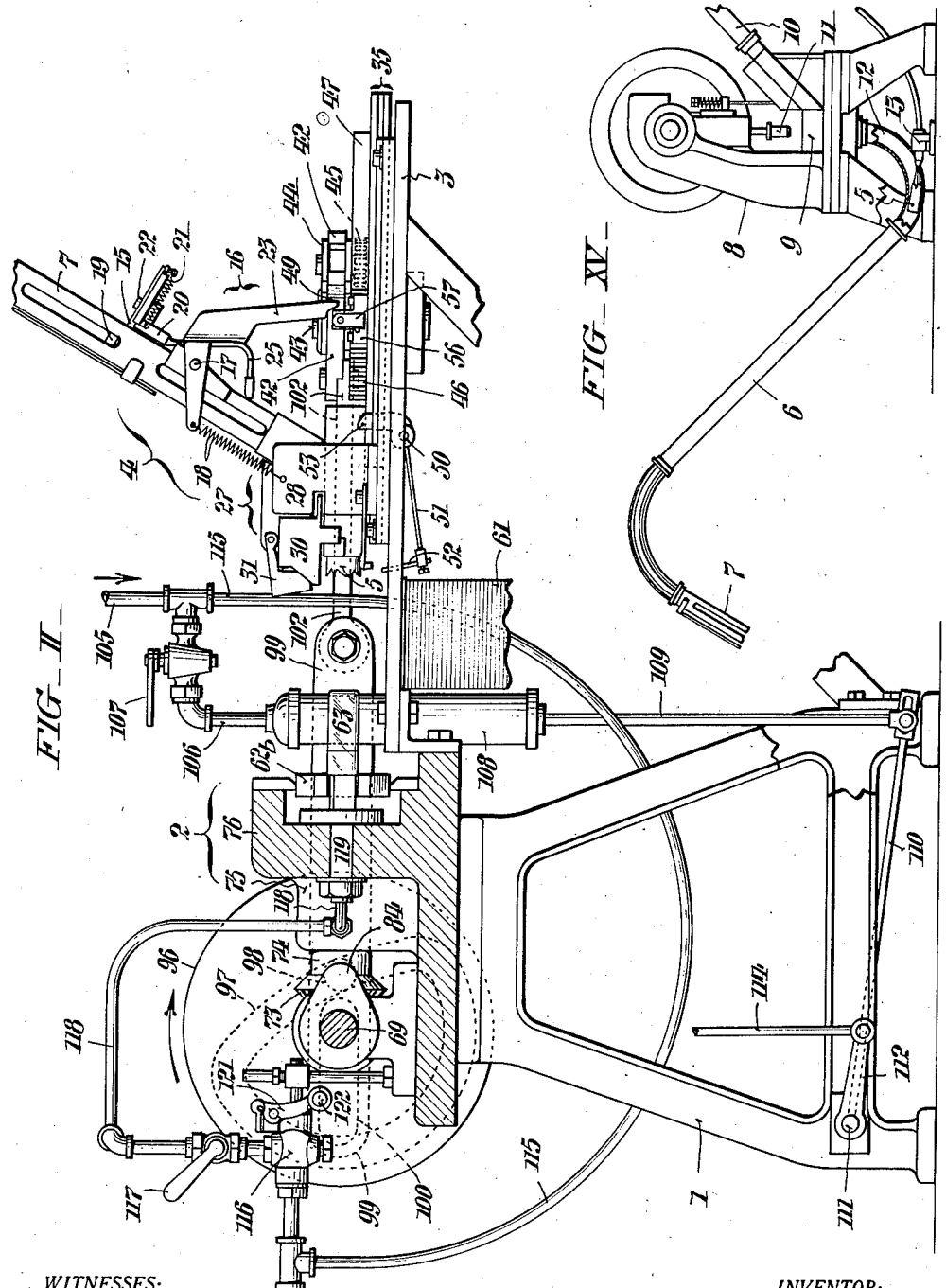

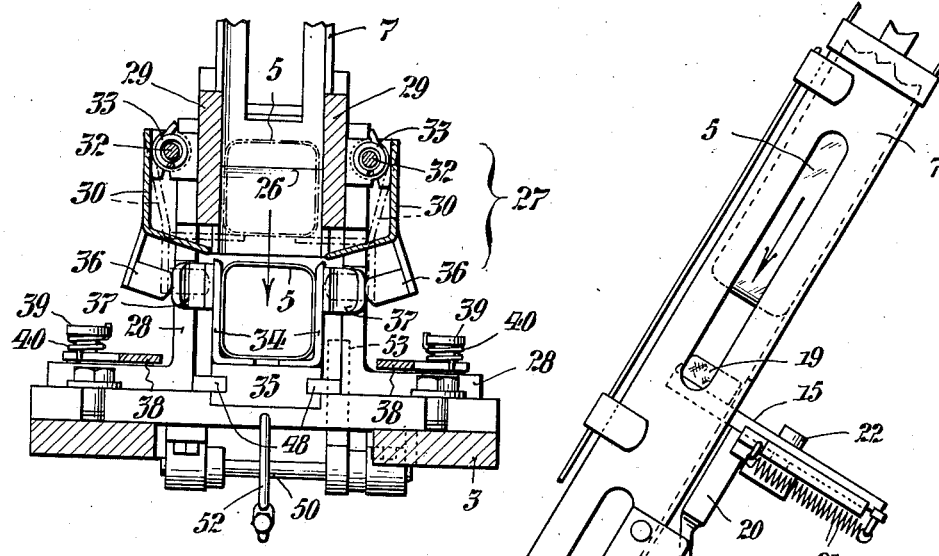

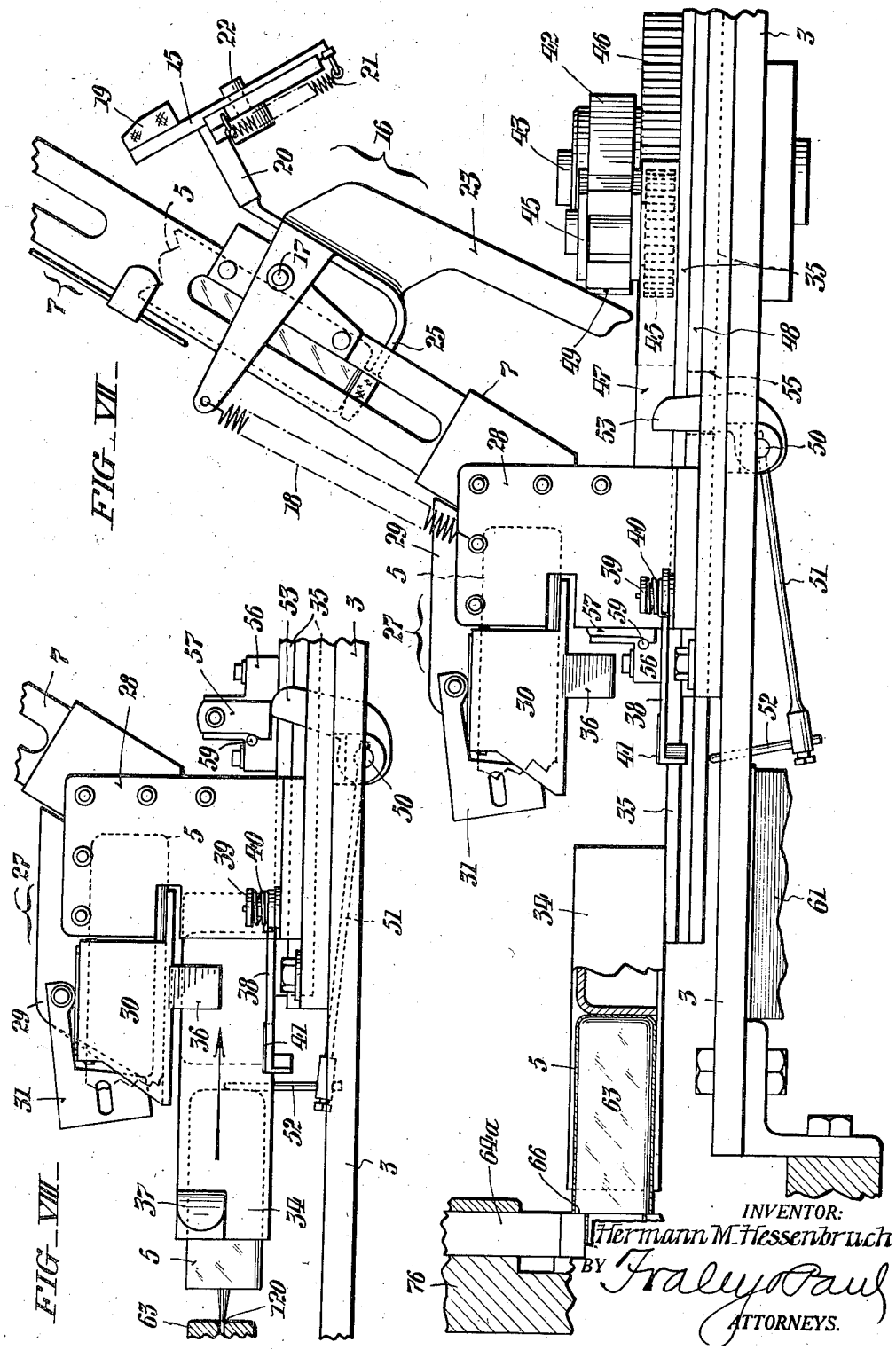

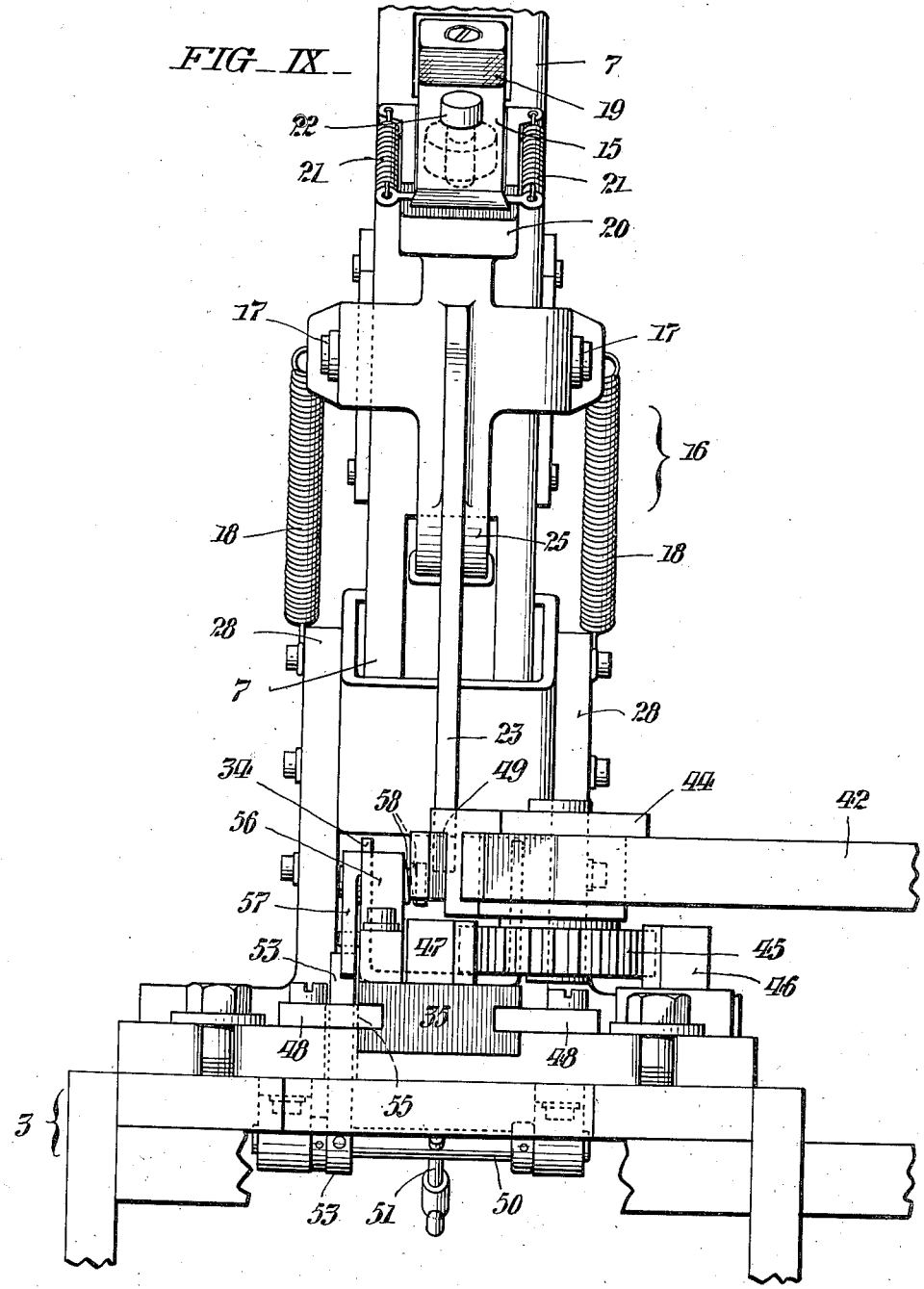

March 23, 1937. H. M. HESSENBRUCH 2,074,547
TRIMMING MACHINE
Filed July 23, 1935 8 Sheets-Sheet 7
FIG. X
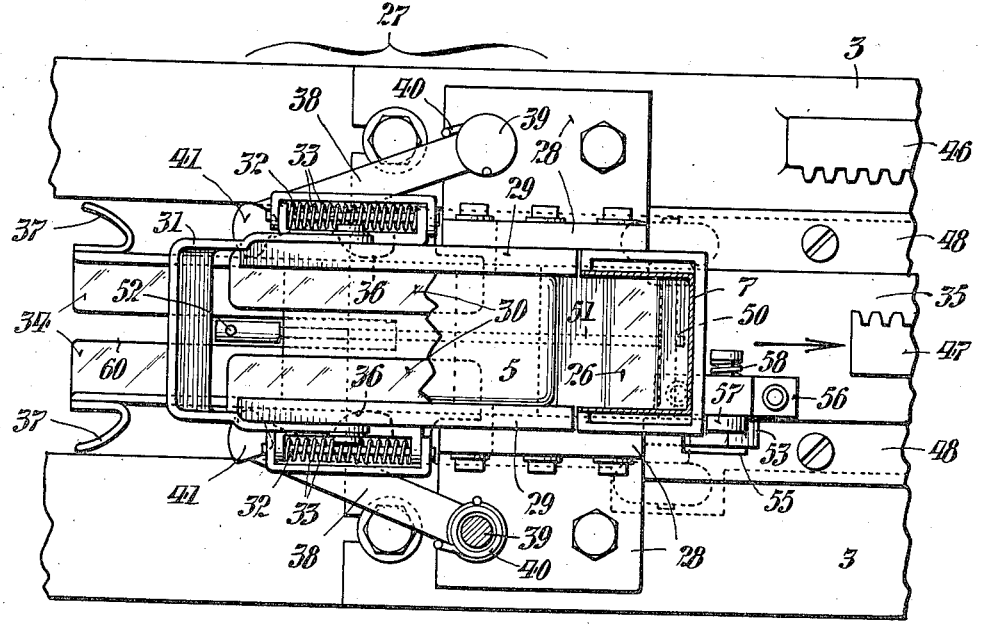
FIG. XI
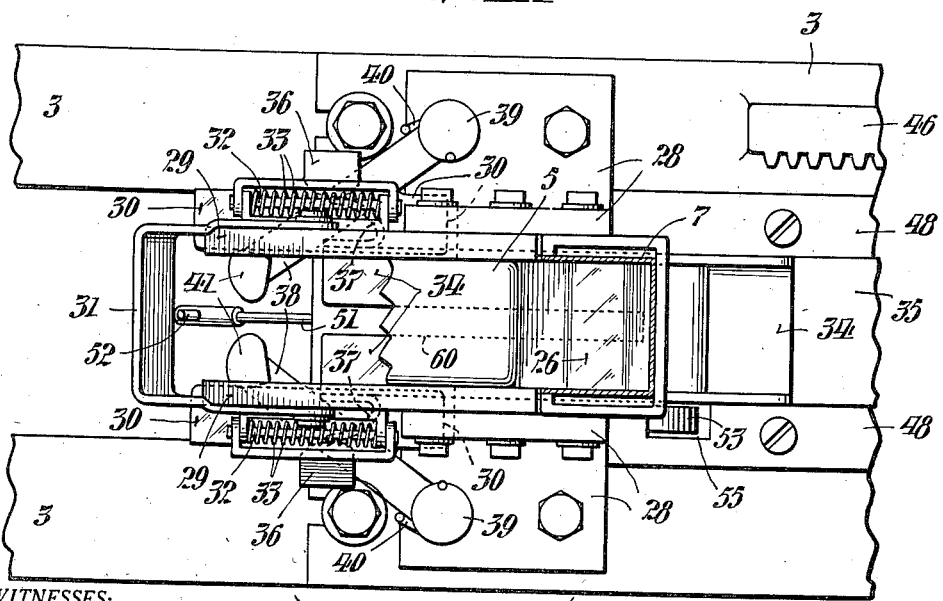
WITNESSES:
INVENTOR:
Hermann M. Hessenbruch,
BY
ATTORNEYS.

March 23, 1937. H. M. HESSENBRUCH 2,074,547
TRIMMING MACHINE
Filed July 23, 1935 8 Sheets-Sheet 8
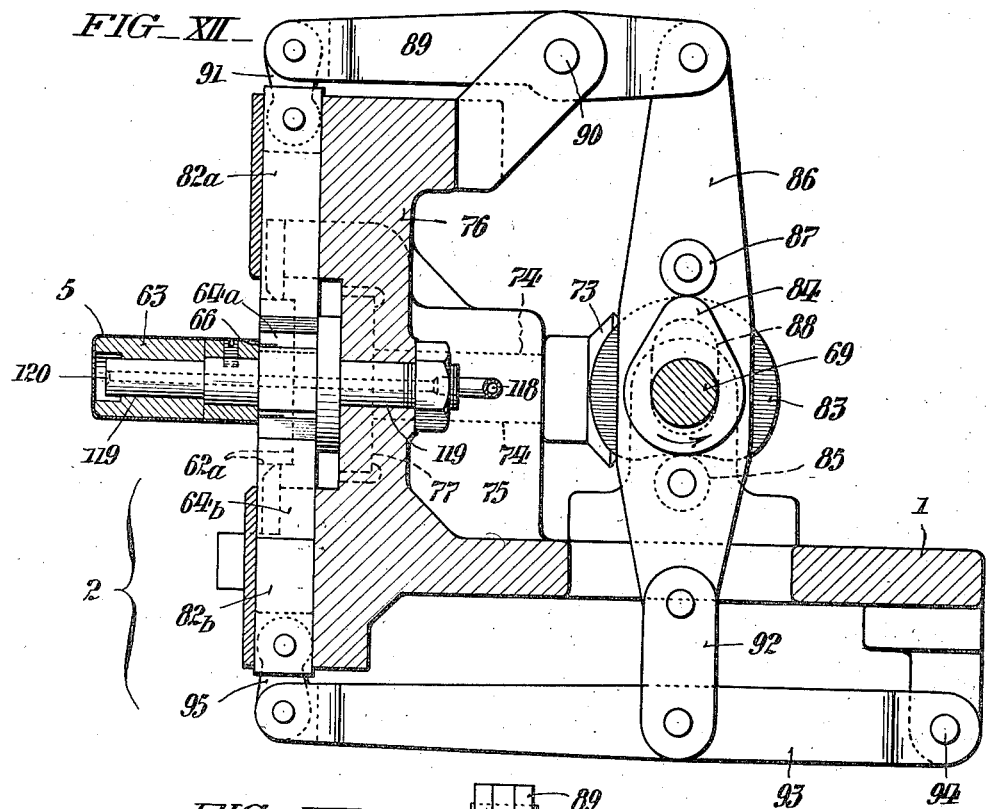
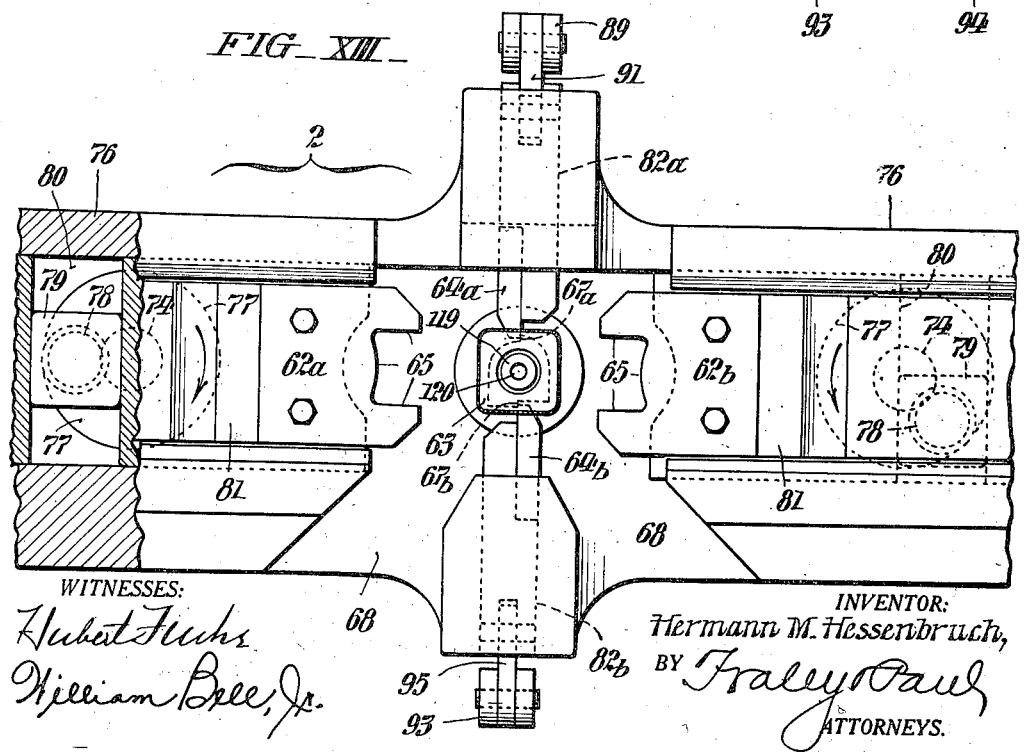
WITNESSES:
INVENTOR:
Hermann M. Hessenbruch,
BY
ATTORNEYS.

Patented Mar. 23, 1937

2,074,547

UNITED STATES PATENT OFFICE 2,074,547

TRIMMING MACHINE

Hermann M. Hessenbruch, Wynnewood, Pa., assignor to Philadelphia Lawn Mower and Mfg. Co., Philadelphia, Pa., a corporation of Pennsylvania Application July 23, 1935, Serial No. 32,744

13 Claims. (Cl. 164—48)

My invention relates to trimming machines and more particularly to machines for cutting off the rough edges of cup-shaped articles of pressed metal. In Letters Patent No. 1,953,757 of the United States granted to me under date of April 3, 1934, there is described an apparatus for making pressed metal articles by successive drawing operations and involving automatic conveying means for guidedly progressing the articles from one press to another. My present invention, though not confined to use with such apparatus, is particularly advantageous when applied to supplement the type of apparatus disclosed in the aforesaid patent, for when so used it provides a fully automatic system for performing all of the drawing and trimming operations required to manufacture cup-shaped articles, and it eliminates the necessity for manual handling, conveying or feeding at any point in the system.

One object of the present invention is to provide a device for trimming the rough edges of cup-shaped articles of rectangular cross section, characterized by means for splitting and casting off the sheared band of scrap metal as an incident to the operation of the trimming cutters.

Another object of the invention is to provide feeding mechanism for guiding and automatically progressing the articles to be trimmed towards a trimming station, momentarily arresting the movement of such articles, and then feeding them individually to the trimming cutters in timed relation to the operation thereof.

Another object of the invention is to provide means for automatically discharging the finished articles from the trimming station without interfering with the progression of succeeding articles towards said station.

Another object of the invention is to coordinate all of the various movements of the trimming and feeding mechanism whereby the machine may be operated continuously and smoothly and at a relatively high rate of speed.

Still other objects and advantages characterizing my present invention will become more fully apparent from the description hereinafter set forth of one embodiment or example of the invention having reference to the accompanying drawings, whereof:

Fig. I represents a plan view of a trimming machine embodying my invention with certain parts of the feeding mechanism removed.

Fig. II represents a view of the trimming machine partly in side elevation and partly in cross section, taken as indicated by the lines II—II of Fig. I.

Fig. III represents a side elevation of the feeding mechanism showing the manner in which the articles to be trimmed are individually progressed through a conveyor conduit towards the trimming machine.

Fig. IV represents a vertical cross section of the feeding mechanism taken as indicated by the lines IV—IV of Fig. III.

Fig. V represents a view similar to Fig. III, but showing parts of the conduit and feeding mechanism cut away to reveal the interior thereof.

Fig. VI represents a cross section of the conduit, taken as indicated by the lines VI—VI of Fig. V.

Fig. VII represents a side elevation, with certain parts cut away, of the feeding mechanism, showing the manner in which the articles to be trimmed are fed individually and automatically to the trimming station.

Fig. VIII represents a side elevation of parts of the feeding mechanism showing the manner in which the trimmed articles are discharged from the trimming station.

Fig. IX represents a rear view of the parts of the feeding mechanism shown in Fig. III.

Figs. X and XI represent plan views of the feeding mechanism showing the parts in different positions representing different stages of operation.

Fig. XII represents a cross section, taken as indicated by the lines XII—XII of Fig. I, showing the manner in which the vertical cutters of the trimming mechanism are operated.

Fig. XIII represents a view of the vertical and horizontal cutters of the trimming mechanism, with certain parts cut away to reveal the actuating mechanism for the horizontal cutters.

Fig. XIV represents a perspective view of a cup-shaped article adapted to be trimmed by the machine represented in the drawings; and Fig. XV represents a view of a press and conveyor conduit showing one type of apparatus with which the trimming machine of my invention may be used to special advantage.

With reference particularly to Figs. I and II, the embodiment of my invention selected for illustration in the drawings comprises generally a supporting standard 1 with trimming mechanism, comprehensively designated at 2, mounted thereon, and an extension table 3 projecting laterally from the standard 1 and carrying thereon a feeding mechanism, comprehensively designated at 4. The particular machine shown in the drawings is adapted to trim the rough top edges of a pressed metal cup 5 of rectangular cross section, as shown in Fig. XIV, the cutting action taking place along the dot-and-dash line indicated at 14, but the machine may obviously be adapted to trim many different types of generally cup-shaped articles.

The articles 5 to be trimmed are conveyed to the feeding mechanism 4 through a conduit 6, as shown in Fig. XV, terminating in a gravity chute 7. As an illustration of a preferred use of the trimming machine of this invention, there is shown in Fig. XV a press 8 of the type described in Letters Patent No. 1,953,757, referred to above, and it will be observed that articles are fed to the bottom die 9 of the press 8 through a conduit 10, then punched by the plunger 11, and are finally discharged into an elbow 12 where a jet issuing from a nozzle 13 impinges upon each article and propels it through the upwardly inclined conduit 6.

As each article passes through the gravity chute 7 towards the table 3 it first strikes a projecting arm 15 of a swinging check device 16 and is momentarily arrested preparatory to passage through the feeding mechanism 4 towards the trimming station. The swinging check device 16 is pivoted at 17 and is normally held by means of springs 18 in the position represented in Figs. II, IV and V. In this position the projecting arm 15 penetrates the gravity chute 7, and a pad 19, of rubber or the like, carried at the end of the arm 15 arrests the cup 5 in the manner most clearly shown in Fig. V. Desirably the arm 15 is slidably mounted on a bracket 20 and may, without swinging of the check device 16, be retracted manually against the pressure of springs 21, by pressing against a pin 22. This is a convenience enabling the ready removal from the gravity chute 7 of any deformed or faulty cups.

The swinging check device 16 includes an actuating lever 23 which is operated automatically and in timed relation to the trimming mechanism 2 in a manner hereinafter described, and it also includes an upsetting arm 25 which serves at one point in the operation to arrest downward movement of a cup, in the manner shown in Fig. VII, and serves at another point in the operation to upset a cup received at the lower ledge 26 of the gravity chute 7, as shown in Fig. V, by striking the upper end thereof, and knocking it over into a horizontal position within a receptacle 27, as represented in Fig. VII. The receptacle 27 is supported on the table 3 by angle brackets 28 and comprises fixed side walls 29, a pair of pivoted trap doors 30 which form the bottom thereof, and a swinging stirrup 31 which affords a removable end wall and gives ready access for removing a cup from the receptacle when desired. Each trap door 30 is pivoted on a pin 32 and normally held in closed position by means of a spring 33. As shown in Fig. IV, the closed position of the trap doors 30 is represented by dot-and-dash lines and the open position by full lines, and it will be seen that upon the opening of the trap doors 30 the cup received in the receptacle 27 is dropped downwardly into a box 34 mounted on a movable slide 35. Each trap door 30 has thereon a depending lug 36 adapted to engage a clip 37 attached to the box 34 and so designed that whenever the box 34 is disposed beneath the receptacle 27 the trap doors 30 are held open against the pressure of the springs 33, as shown in Figs. IV and X, permitting the cup to fall into the box 34, and whenever the slide 35 and its box 34 are moved forwardly towards the trimming station, as shown in Figs. VII and X, the clips 37 disengage the lugs 36 and allow the trap doors 30 to close.

In order to provide additional support for the forward end of the cup when deposited in the box 34 from the receptacle 27 a pair of swinging fingers 38 is desirably provided. As shown most clearly in Fig. XI, the fingers 38 are pivoted at 39 and urged towards each other by springs 40. When the box 34 is disposed beneath the receptacle 27 the free ends 41 of the fingers 38 extend forwardly of the box and prevent the possibility of a cup dropping through the gap forward of the box and insure the proper seating of the cup within the box. When the slide 35 and box 34 move forwardly, they automatically spread the fingers 38 against the pressure of the springs 40 to the position represented in Fig. X.

The slide 35, as most clearly shown in Fig. I, is operated by means of a lever 42 pivoted at 43 on the table 3. One end of the lever 42 is bifurcated and carries a sliding block 44 with a pinion 45 thereon. The pinion 45 engages at one side a fixed rack 46 secured to the table 3, and at the other side a rack 47 secured to the movable slide 35. In an obvious manner swinging movement of the lever 42 about its fulcrum 43 imparts a reciprocatory movement to the slide 35 and causes the same to move towards or away from the trimming station. The slide 35, as shown in Figs. IV and IX, is grooved at each side thereof for guided engagement with laterally projecting tongues afforded by the side edges of a pair of plates 48 secured to the table 3. The actuating lever 23 of the swinging check device 16 is adapted to be engaged by the inner corner 49 at the bifurcated end of the lever 42. As shown in Fig. VII, when the slide 35 moves forwardly to advance a cup towards the trimming station, the corner 49 on the end of the lever 42 strikes the back of the actuating lever 23 of the swinging check device 16 and causes the upper arm 15 thereof to be retracted and the lower upsetting arm 25 thereof to be projected into the gravity chute 7.

Beneath the table 3 there is pivotally attached at 50 a lever 51 carrying a stop finger 52, as shown in Fig. VII. The lever 51 is actuated by a lug 53 which projects upwardly through a slot 55 in one of the plates 48 to a position alongside the slide 35. On the slide 35 there is carried a pedestal 56, shown most clearly in Fig. VIII, which has a swinging arm 57 urged by a light spring 58 (see Fig. IX) against a pin 59. As the slide 35 moves forwardly towards the trimming station from the position shown in Fig. I to the position shown in Fig. VII, the swinging arm 57 moves away from the pin 59 and passes over the top of the lug 53, and accordingly there is no upward movement of the stop finger 52. On the return movement of the slide 35, the swinging arm 57 strikes the top of the lug 53, and being held by the pin 59, forces the lug downward, causing the stop finger 52 to be projected upwardly through the slot 60 in the bottom of the box 34 to the position represented in Fig. VIII. In this position the stop finger 52 serves to block the return movement of the cup from the trimming station, causing the cup to drop into a chute 61 from whence it may be discharged into a cleaning bath. With continued rearward movement of the slide 35, the swinging arm 57 passes over the top of the lug 53, and the stop-finger 52 is dropped to its original position.

As shown most clearly in Fig. XIII, the trimming mechanism 2 comprises generally a pair of oppositely disposed trimming cutters 62a, 62b, movable horizontally towards a mandrel 63, upon which each cup is positioned by the above described feeding mechanism, and an additional pair of oppositely disposed cutters 64a, 64b movable vertically towards the mandrel 63, and adapted to split the trimmed portion of the cup and cast it off as scrap metal. The trimming cutters 62a, 62b are provided in the illustrated example with substantially U-shaped cutting edges 65, corresponding to one-half the cross-sectional shape of the article to be cut, and are operated in sequence, the cutter 62a first engaging the cup on the mandrel 63 and penetrating a little over half way through the cup, and the cutter 62b then penetrating the cup from the opposite side and overlapping the first cut in order to sever completely the rough ring of metal at the forward end of the cup. The band of metal thus severed is then split at its top and bottom portion by the cutters 64a, 64b which move simultaneously towards the mandrel 63. To facilitate the trimming of the rough edges of a cup, the mandrel 63 is formed with a shoulder 66, as shown in Fig. XII, which serves as a die cooperating with the trimming cutters 62a, 62b, and rearwardly of the shoulder 66, the mandrel is formed with shoulders 67a, 67b, which cooperate with the vertical cutters 64a, 64b, and which are so shaped as to tend to prevent the split pieces of the trimmed metal from sticking on the mandrel whereby such pieces are cast off, one at each side of the mandrel, and dropped through openings 68, as an incident to the operation of the vertical cutters 64a.

The cutters 62a, 62b and 64a, 64b are operated from a revolving shaft 69 connected through a clutch 70 to a belt pulley 71, as shown in Fig. I. On the operating shaft 69 there are two bevel gears 72 meshing with bevel gears 73 on shafts 74 mounted in bearings 75 which are in turn supported on an upstanding plate 76 of the standard 1. Each shaft 74 terminates in a crank disc 77 having an eccentric crank pin 78 and a block 79 freely mounted thereon. The blocks 79, as shown in Fig. XIII, slide within rectangular recesses 80 in holders 81 which carry the cutters 62a, 62b. In an obvious manner rotation of the eccentric discs 77 causes the cutter holders 81 to be reciprocated horizontally within guideways formed in the plate 76, and the crank pins 78 are so disposed as to cause the cutters 62a, 62b to operate in sequence. With each revolution of the operating shaft 69 the cutters 62a, 62b complete the trimming of a cup on the mandrel.

As shown in Figs. XII and XIII, the cutters 64a, 64b are carried by vertically movable holders 82a, 82b sliding in guideways on the front of the plate 76. The vertical cutters 64a, 64b are operated by a pair of cams 83, 84 on the operating shaft 69. The cam 83 is substantially heart shaped and engages a roller 85 on a slotted bar 86, as shown in Fig. XII, whereas the cam 84 on the other side of the slotted bar 86 is substantially pear shaped and engages a roller 87 thereon. The operating shaft 69 passes through an elongated slot 88 in the bar 86, and with rotation of the operating shaft 69, it will be apparent that the action of the cams 83, 84 causes the bar 86 to reciprocate in a substantially vertical direction. At the upper end of the bar 86, there is a lever 89 pivotally connected thereto. The lever 89 is adapted to rock about a fulcrum 90 and is connected at its other end to a link 91 which is in turn connected to the upper cutter holder 82a. At the lower end of the bar 86 there is a link 92 pivotally connected thereto. The link 92 is connected to a lever 93, adapted to rock about a fulcrum 94, and in turn connected at its opposite end to a link 95 which joins the lower cutter holder 82b. The above described parts are so designed and proportioned as to cause the vertical cutters 64a, 64b to move simultaneously towards and away from the mandrel 63, and the cams 83, 84 are so related to the crank pins 78 on the discs 77 that the action of the vertical cutters 64a, 64b immediately follows the action of the trimming cutters 62a, 62b.

At the opposite end of the operating shaft 69 from the pulley 71 there is a disc 96 having a cam groove 97, shown in outline in Fig. II. Cooperating with the cam groove 97, there is a roller 98 attached to a sliding bar 99. The sliding bar 99 is formed at one end with a slot 100 surrounding the end of the operating shaft 69, and it is supported at its medial portion by a slot 101 on a stationary part of the machine. The cam groove 97 is so formed that throughout a substantial part of each revolution of the operating shaft 67 the reciprocatory bar 99 does not move, and throughout the remaining part of the revolution, the bar 99 moves rapidly back and forth. The bar 99 is connected through a link 102 with the lever 42, and serves to operate the slide 35. Its motion is so timed with relation to the trimming operation, that the slide 35 feeds each cup to the mandrel 63 just before the cutter 62a comes into action.

A compressed air line 105 leads to the trimming machine and there divides into two branches, as shown in Fig. II. One branch 106 leads through a valve 107 to a pressure pot 108. A plunger in the pressure pot 108 has its stem 109 connected to a lever 110 fulcrumed at a shaft 111 at the base of the standard 1. An additional lever 112 on the shaft 111 is connected to a rod 114 which actuates the clutch 70 to engage the belt pulley 71 with the operating shaft 69 when pressure is admitted to the pressure pot 108. The other branch 115 of the compressed air line leads to an automatic valve 116 and thence through a regulating valve 117 to a pipe 118. Air from the pipe 118 is admitted to a pipe 119 which passes through the plate 76 and centrally through the mandrel 63 terminating in an orifice 120. Air issuing from the orifice 120 strikes the base of a cup on the mandrel 63 and blows the cup back against the stop-finger 52, causing it to be cast into the discharge chute 61. The air jet at the orifice 120 is controlled by means of the automatic valve 116, which has an operating lever 121 with a roller 122 at the end thereof, operated by the cam 84. Immediately after the vertical cutters 64a, 64b have operated to split the trimmed portion of metal, the cam 84 strikes the roller 122 and opens the valve 116 causing the jet of air to issue at the orifice 120 and withdrawing the cup positioned on the mandrel 63.

The operation of the above described apparatus is as follows:

The trimming machine 2 is regulated to run at a speed equal to or greater than the speed of the press, or battery of presses, which performs the successive drawing operations upon the cups prior to their delivery to the gravity chute 7. The cups are thus fed to the gravity chute 7 at such a rate that the trimming machine can perform its operation with sufficient rapidity to prevent any jamming or piling up of cups in the gravity chute. As each cup reaches the gravity chute 7, it is momentarily arrested by the projecting arm 15 of the swinging check device 16 and held in the position shown in Fig. V. Accompanying forward movement of the slide 35, the corner 49 of the lever 42 strikes the operating lever 23 of the swinging check device 16, causing this device to reverse its position, and dropping the cup previously admitted to the gravity chute 7 to the position indicated in Fig. VII, where it rests upon the upsetting arm 25. At the same time, the forward movement of the upsetting arm 25 acts upon a cup received at the lower ledge 26 of the gravity chute 7, turning the cup end for end and depositing it in the receptacle 27. Thus the cups are fed singly with temporarily arrested movement to the base of the gravity chute 7, and they are then turned end for end and deposited within the receptacle 27.

Accompanying the rearward movement of the slide 35, the clips 37 on the box 34 open the trap doors 30 and cause the cup received in the receptacle 27 to drop downwardly into the box 34, as indicated in Figs. III and IV. When the slide 35 moves forwardly again, the box 34 carries the cup there received to the trimming station, and feeds the cup upon the mandrel 63 in the manner illustrated in Fig. VII.

As soon as a cup is received upon the mandrel 63, the trimming operation commences. First the trimming cutter 62a moves towards the mandrel 63 and penetrates through a little more than half of the circumference of the cup, then the trimming cutter 62b comes into action from the other side, overlapping the previous cut and causing a complete severance of a ring of metal. At this point the vertical cutters 64a, 64b move simultaneously from above and below towards the shoulders 67a, 67b, respectively, of the mandrel 63 and split the trimmed portion of metal into two pieces, at the same time casting off these pieces one at each side, and causing them to drop clear of the operating parts of the machine.

The trimming operation having been completed, the automatic valve 116 is operated by engagement of the cam 84 with the end of the valve lever 121, and an air jet is caused to issue from the orifice 120 of the mandrel 63, the jet impinging upon the base of the cup on the mandrel, and causing the cup to be propelled rearwardly in a reverse direction to that from which it has approached the mandrel, as indicated in Fig. VIII. The cup in rebounding strikes the stop-finger 72, which in the meanwhile has been raised to the position indicated in Fig. VIII, and drops downwardly into the chute 61, by means of which it may be carried away from the machine to a cleaning bath.

It will be observed that the various movements described above follow automatically in a prescribed succession, and in timed relation to the revolution of the operating shaft 69, and hence in timed relation to the action of the cutting means. The articles are fed singly towards the trimming station and are guided throughout their movement in such manner as to minimize the danger of jamming at any point in the system. It will be seen that by combining the apparatus of this invention with a battery of presses of the type shown in my Patent No. 1,953,757, referred to above, there is provided a complete automatic system whereby all of the operations of drawing and trimming incident to the manufacture of a cup-shaped article are performed automatically and in a prescribed succession without requiring any manual handling, feeding or conveying.

While I have described my invention with reference to a specific embodiment thereof, designed for the manufacture of an article of particular shape, and have described in some detail a preferred form of trimming mechanism and feeding mechanism, it will be apparent that various changes may be made in the machine herein described and illustrated without departing from the spirit of the invention, and that certain features of the invention may at times be used to advantage without a corresponding use of other features.

Having thus described my invention, I claim:

1. In a trimming machine of the character described, a mandrel for receiving a cup-shaped article, reciprocating cutting means for trimming the edges of the article, while on said mandrel, means for guidedly conveying the articles towards said mandrel and feeding them singly thereto in timed relation to the operation of said cutting means, and means for withdrawing the articles from said mandrel and casting them clear of the articles approaching said mandrel.

2. In a trimming machine of the character described, a mandrel for receiving a cup-shaped article, reciprocating cutting means for trimming the edges of the article while on said mandrel, means for guidedly conveying the articles towards said mandrel and feeding them singly thereto in timed relation to the operation of said cutting means, and a pressure jet within said mandrel for removing the articles therefrom, said jet operating automatically at the completion of the trimming operation.

3. In a trimming machine of the character described, a mandrel for receiving a cup-shaped article, reciprocating cutting means for trimming the edges of the article while on said mandrel, means for guidedly conveying the articles towards said mandrel in the direction of its longitudinal axis and positioning the articles singly on said mandrel in timed relation to the operation of said cutting means, a pressure jet for removing the articles from said mandrel, and a movable stop member for deflecting the articles thus removed out of the path of the articles approaching said mandrel.

4. In a trimming machine of the character described, a trimming station, reciprocating cutting means at said station for trimming the edges of a cup-shaped article, a conduit leading to said trimming station for conveying the articles thereto, means for momentarily arresting each article received through said conduit, and means for feeding the articles singly to said trimming station and withdrawing the articles in a reverse direction therefrom in timed relation to the operation of said cutting means.

5. In a trimming machine of the character described, a trimming station, cutting means at said station for trimming the edges of a cup-shaped article, a conduit leading to said trimming station for conveying the articles bottom-first towards said trimming station, means for turning said articles end for end, and means for feeding the articles thus turned singly to said trimming station in timed relation to the operation of said cutting means.

6. In a trimming machine of the character described, a mandrel for receiving cup-shaped articles, cutting means for trimming the edges of each article while on said mandrel, a conduit leading to said mandrel and serving to convey the articles thereto bottom-first, means for turning said articles end for end, and means for sliding the articles thus turned and feeding them singly onto said mandrel in timed relation to the operation of said cutting means.

7. In a trimming machine of the character described, a trimming station, cutting means at said station for trimming articles there received, a conduit terminating in a gravity chute and serving to convey the articles towards said trimming station, a slide at the base of said gravity chute for receiving each article as it is discharged therefrom and carrying it to said trimming station, means for momentarily arresting each article as it passes through the gravity chute, means for upsetting each article at the end of the gravity chute, means for depositing each article thus upset upon the slide, and means for moving the slide towards the trimming station, all of said means operating in timed relation to the operation of said cutting means.

8. In a trimming machine of the character described, a trimming station, cutting means at said station for trimming articles there received, a conduit serving to convey the articles towards said trimming station, means at the end of said conduit for receiving each article as it is discharged therefrom and carrying it to said trimming station, and a swinging check device associated with said conduit having an arm for upsetting each article received at the end of said conduit and turning it end for end, and an additional arm for momentarily arresting the movement of articles through said conduit at a point in advance of said upsetting arm.

9. In a trimming machine of the character described, a trimming station, cutting means at said station for trimming articles there received, a conduit through which articles are conveyed towards said trimming station, a receptacle at the end of said conduit for receiving each article as it is discharged therefrom, a slide beneath said receptacle for carrying each article to the trimming station, a trap door at the base of said receptacle through which each article is deposited therefrom onto said slide, and means for operating said slide and trap door whereby the articles are fed singly to said trimming station in timed relation to the operation of said cutting means.

10. In a trimming machine of the character described, a mandrel for receiving cup-shaped articles of corresponding cross-sectional configuration, a pair of oppositely disposed cutters movable in a plane substantially at right angles to the axis of said mandrel and operating in sequence to trim the article thereon by fractional cuts, each said cutter having a U-shaped cutting edge corresponding substantially to one-half the cross-sectional shape of the article to be cut and being adapted to cut substantially half way through said article, and means including additional cutters operating in a plane at right angles to that of said first named cutters, for splitting and casting off the trimmed portion.

11. In a trimming machine of the character described, a mandrel for receiving exteriorly a cup-shaped article, oppositely disposed cutters having U-shaped cutting edges and operating in sequence to trim the article on said mandrel by fractional cuts with incidental severance of a band at the rim of said article, means operating in timed relation to said cutters for splitting said band and casting off the split pieces, and means operating in timed relation to said cutters for automatically and guidedly feeding said articles one at a time to said mandrel and removing them from said mandrel.

12. In a trimming machine of the character described, a mandrel shaped to receive a cup shaped article of predetermined configuration, a plurality of cutters having capacity for cutting in a plane substantially at right angles to the axis of the mandrel, said cutters operating sequentially around the mandrel with overlapping fractional cuts resulting in complete severance of a band at the rim of the article, and a splitting cutter having capacity for movement across the circumference of said band for splitting the same and serving also to cast off the split band from the mandrel.

13. In a trimming machine of the character described, a mandrel shaped to receive a cup shaped article of predetermined configuration, a plurality of cutters having capacity for cutting in a plane substantially at right angles to the axis of the mandrel, said cutters operating sequentially around the mandrel with overlapping frictional cuts resulting in complete severance of a band at the rim of the article, and a plurality of additional splitting cutters operating simultaneously, said mandrel being formed with recesses to receive the splitting cutters, and said splitting cutters forcing the band into said recesses in such manner that the split segments are cast away from the mandrel.

HERMANN M. HESSENBRUCH.